United States Patent
Saska et al.

(10) Patent No.: US 6,451,123 B1
(45) Date of Patent: Sep. 17, 2002

(54) PROCESS FOR THE SEPARATION OF SUGARS

(75) Inventors: Michael Saska, Baton Rouge, LA (US); Feng Chen, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/481,732

(22) Filed: Jan. 11, 2000

Related U.S. Application Data
(60) Provisional application No. 60/183,032, filed on Jan. 14, 1999.

(51) Int. Cl.$^7$ .............................................. B01D 15/08
(52) U.S. Cl. ..................................... 127/46.2; 127/46.3
(58) Field of Search ................................ 127/46.2, 46.3

(56) References Cited

U.S. PATENT DOCUMENTS

| | | | |
|---|---|---|---|
| 2,985,589 A | 5/1961 | Broughton et al. ............ | 210/34 |
| 3,471,329 A | 10/1969 | Quietensky et al. .......... | 127/46 |
| 3,677,818 A | 7/1972 | Casebier et al. ........... | 127/46 R |
| 3,806,363 A | 4/1974 | Takasaki ...................... | 127/46 |
| 3,864,166 A | 2/1975 | Barker et al. ............. | 127/46 R |
| 4,075,406 A | 2/1978 | Melaja et al. .................. | 536/1 |
| 4,404,037 A | 9/1983 | Broughton .................... | 127/55 |
| 4,471,114 A | 9/1984 | Sherman et al. ............. | 536/127 |
| 4,837,315 A | 6/1989 | Kulprathipanja ............ | 536/127 |
| 5,084,104 A | 1/1992 | Heikkila et al. ........... | 127/46.2 |
| 5,198,120 A | 3/1993 | Masuda et al. ............. | 210/659 |
| 4,412,866 A | 11/1993 | Schoenrock et al. ....... | 127/46.2 |
| 5,466,795 A | 11/1995 | Devos ........................ | 536/125 |
| 5,482,631 A | 1/1996 | Saska et al. ................ | 210/635 |

FOREIGN PATENT DOCUMENTS

| | | |
|---|---|---|
| EP | 0 115 631 A1 | 12/1983 |
| EP | 0 302 970 A1 | 8/1987 |
| EP | 0 345 511 A2 | 5/1989 |
| EP | 0 481 603 A1 | 9/1991 |
| GB | 1 540 556 | 12/1977 |

OTHER PUBLICATIONS

Caruel, H. et al., "Carbohydrate separation by ligand–exchange liquid chromatography: correlation between the formation of sugar–cation complexes and the elution order," J. Chromatogr. 558(1), pp. 89–104 (1991).

Caruel, H., "Procede de Separation Continu d'Hydrates de Carbone par Chromatographie Liquide en Simulation de Lit Mobile," Ph.D. Dissertation, National Polytechnic Institute of Toulouse, France (Jun. 1991).

Dionex Corporation, "Installation instructions and Troubleshooting Guide for the CARBOPAC™ PA10 Analytical Column," Document No. 031193, Revision 02, p. 20 (Jul. 12, 1996).

Floridi, A., "An improved method for the automated analysis of sugars by ion–exchange chromatography," Journal of Chromatography 59, pp. 61–70 (1971).

Gardell, S., "Chromatographic separation and quantitative determination of monosaccharides," Acta Chemica Scandinavica 7, pp. 201–206 (1953).

Kennedy, J. et al., "The fully automatic ion–exchange and gel–permeation chromatography of neutral monosaccharides and oligosaccharides with Jeolco JLC–6AH analyzer," Carbohydr. Res. 54, pp. 13–21 (1977).

Kesler, R., "Rapid quantitative anion–exchange chromatography of carbohydrates," Analytical Chemistry v. 39 n. 12, pp. 1416–1422 (1967).

Khym, J. et al., "The separation of sugars by ion–exchange," J. Amer. Chem. Soc., 74, pp. 2090–2094 (1952).

Larsson, L. et al., "An automated procedure for separation of monosaccharides on ion exchange resins," Acta Chemica Scandinavica 19 n.6, pp. 1357–1364 (1965).

Takasaki, Y., "On the separation of sugars," Agr. Biol. Chem. v. 36 n.13, pp. 2575–2577 (1972).

Zill, L. et al., "Further Studies on the Separation of the Borate Complexes of Sugars and Related Compounds by Ion–Exchange Chromatography," J. Am. Chem. Soc. (1953), 75, 1339–1344.

Larsson, L. et al., "An Automated procedure for Separation of Monosaccharides on Ion Exchange Resins," Acta Chemica Scandinavica, vol. 19, pp. 1357–1364 (1965).

Samuelson, O. et al., "Partition Chromatography of Mixtures Containing Polyols and Carbonyl Compounds (Including Sugars) On Ion Exchange Resins," Acta Chemica Scandinavica, vol. 22, pp. 1252–1258 (1968).

Zill, L. et al., "Further Studies on the Separation of the Borate Complexes of Sugars and Related Compounds by Ion–exchange Chromatography," J. Am. Chem. Soc., vol. 75, pp. 1339–1342 (1953).

Dionex Corporation, "Installation Instructions and Troubleshooting Guide for the CarboPac™ Pa1," document No. 034441, revision 01, pp. 1–28 (Oct. 1, 1990).

Dionex Corporation, "Installation Instructions and Troubleshooting Guide for the CarboPac™ PA10," document No. 031193, revision 02, pp. 1–36 (Jul. 12, 1996).

Primary Examiner—David Brunsman
(74) Attorney, Agent, or Firm—John H. Runnels (57) ABSTRACT

Improved separations of xylose, mannose, galactose, arabinose, glucose, xylitol, arabitol; sorbitol, galactitol, or mannitol (and other monosaccharides and sugar alcohols) from other sugars and sugar alcohols may be achieved by chromatography over hydroxyl-form anion exchange surfaces prepared from anion exchange resins at relatively low hydroxyl concentrations. When a strong base anion exchange resin, such as a chloride-form strong base anion exchange resin, is conditioned with a low concentration of hydroxyl (for example, an NaOH solution with a concentration between 0.1 and 1000 mM, most preferably between 1 and 10 mM), the conditioned resin separates a number of sugars and sugar alcohols from one another, while still allowing ready desorption from the resin.

31 Claims, 3 Drawing Sheets

PROCESS FOR THE SEPARATION OF SUGARS

The benefit of the Jan. 14, 1999 filing date of provisional application No. 60/183,032 (which was a conversion of nonprovisional application No. 09/231,193) is claimed under 35 U.S.C. § 119(e).

This invention pertains to processes for separating sugars and sugar alcohols, such as xylose, mannose, galactose, arabinose, glucose, xylitol, arabitol, sorbitol, galactitol, or mannitol from mixtures with other sugars or sugar alcohols, mixtures such as hardwood or softwood liquors.

Most industrial xylose production is currently based on recovery from hardwood liquors (USA, Russia, Finland, Norway, Austria), with smaller quantities from sugarcane bagasse (China), and possibly other hemicellulose-rich feedstocks. Most industrially produced xylose is hydrogenated to produce xylitol, a specialty sweetener with outstanding properties as a component of oral hygiene products, diabetic foods and other specialty products. Alternate routes to xylitol are via fermentation of glucose with osmiophilic yeast and enzymatic isomerization, or via xylonic acid by oxidation of glucose, fructose, or galactose.

Mannitol, another specialty sweetener widely used in sugarless chewing gums, is produced industrially by simultaneous chemical isomerization and hydrogenation of fructose, or by enzymatic isomerization of fructose and hydrogenation of the purified mannose. Fermentations of sugars to mannitol are known, and some biomass feedstocks high in mannose do exist. It has been reported that coffee extraction residues and ivory nut meal are good sources of mannose, as are the softwood liquors. Mannitol is also produced by direct extraction from seaweed in China. In chemical isomerization processes, the product mix may contain 60–70% sorbitol and 30–40% mannitol, depending on the hydrogenation conditions; the two are then typically separated by fractional crystallization.

After polysaccharides from biomass hemicellulose, such as arabinoxylan, galactomannan, glucomannan, etc., are hydrolyzed to the corresponding monosaccharides, such as arabinose, galactose, glucose, etc., the separation of the monosaccharides from one another or from sugar alcohols is difficult because of their chemical similarity. Some prior separation processes have been used, including several that rely on chromatography; but only limited efficiencies have been achieved with these prior separation processes.

After plant tissues are hydrolyzed, the resulting "hemicellulose hydrolysates" typically contain mixtures of five- and six-carbon sugars, the pentoses and hexoses. The sugar xylose predominates in hydrolysates from hardwoods and annual plants, while softwood liquors typically comprise primarily mannose, with smaller quantities of xylose, glucose and other sugars. Typical sugar profiles are shown in Table I, whose data are taken from U.S. Pat. No. 5,084,104 and U.S. Pat. No. 3,677,818.

TABLE I

Typical sugar profiles in hardwood and softwood liquors, expressed as percentages of total sugars.

|  | Hardwood - Sulfuric acid hydrolysate of Birch | Softwood - Southern Pine prehydrolysis liquor |
| --- | --- | --- |
| Xylose | 71.5 | 20.6 |
| Mannose | 7.1 | 37.4 |
| Glucose | 10.1 | 16.5 |
| Galactose | 7.7 | 21.2 |
| Arabinose | 3.6 | 4.3 |

From hydrolyzed and properly de-ashed and de-lignified hardwood liquors (or other biomass hydrolysates with an excess of xylose), xylose can be recovered by crystallization. After crystallization a non-crystallizing syrup remains, "xylose molasses," which is a mixture of xylose, glucose, mannose, and other sugars. On the other hand, hydrolyzed and purified softwood liquors, rich in mannose, do not crystallize readily, even where the liquors are nearly free of non-sugar constituents. The reason may be that xylose, glucose, and possibly other sugars inhibit mannose crystallization. Although crystallization can be induced with ethanol or methanol, sugar recovery from such non-crystallizing syrups may be best achieved by chromatography. Separation media such as zeolites and ion exchange resins have been tested for their ability to separate the various sugar constituents. See Table II.

TABLE II

Processes for industrial sugar separations described in the literature. (Note: Glucose/fructose separation, practiced on a large scale in the corn sweetener industry, is excluded as it is not considered pertinent to the separation of biomass-based sugar liquors.)

| Sugar Pair | System | Reference |
| --- | --- | --- |
| Glucose/ Mannose | cation/Ca++ | Caruel et al., 1991; Caruel, 1991 |
|  | cation/Pb++ | Caruel et al., 1991; Caruel, 1991 |
|  | anion/aryl borate | U.S. Pat. No. 3,864,166 |
|  | cation/Ca++ | U.K. Patent 1,540,556 |
|  | zeolites | Eur. Pat. Appl. 115,631, 1983 |
|  | zeolites | Eur. Pat. Appl. 302,970, 1987 |
|  | zeolites | U.S. Pat. No. 4,471,114 |
|  | cation/ Ca++NH4+ | U.S. Pat. No. 4,837,315 |
|  | mannose-bisulfite complex | U.S. Pat. No. 3,677,818 |
| Glucose/Xylose | cation/Ca++ | Caruel et al., 1991; Caruel, 1991 |
|  | cation/Pb++ | Caruel et al., 1991; Caruel, 1991 |
|  | anion/aryl borate | U.S. Pat. No. 3,864,166 |
|  | anion/sulfate | U.S. Pat. No. 5,084,104 |
| Glucose/Arabinose | cation/Ca++ | Caruel et al., 1991; Caruel, 1991 |
|  | cation/Pb++ | Caruel et al., 1991; Caruel, 1991 |
| Glucose/Galactose | cation/Ca++ | Caruel et al., 1991; Caruel, 1991 |
|  | cation/Pb++ | Caruel et al., 1991; Caruel, 1991 |
|  | cation/hydrazine | U.S. Pat. No. 3,471,329 |
| Xylose/Mannose | cation/Ca++ | Caruel et al., 1991; Caruel, 1991 |
|  | cation/Pb++ | Caruel et al., 1991; Caruel, 1991 |
|  | mannose-bisulfite complex | U.S. Pat. No. 3,677,818 |
|  | anion/sulfate | U.S. Pat. No. 5,084,104 |
| Xylose/Arabinose | cation/Ca++ | Caruel et al., 1991; Caruel, 1991 |
|  | cation/Pb++ | Caruel et al., 1991; Caruel, 1991 |
|  | anion/sulfate | U.S. Pat. No. 5,084,104 |
| Xylose/Galactose | cation/Ca++ | Caruel et al., 1991; Caruel, 1991 |
|  | cation/Pb++ | Caruel et al., 1991; Caruel, 1991 |
|  | anion/sulfate | U.S. Pat. No. 5,084,104 |
| Mannose/ Arabinose | cation/Ca++ | Caruel et al., 1991; Caruel, 1991 |
|  | cation/Pb++ | Caruel et al., 1991; Caruel, 1991 |
| Mannose/Galactose | cation/Ca++ | Caruel et al., 1991; Caruel, 1991 |
|  | cation/Pb++ | Caruel et al., 1991; Caruel, 1991 |

TABLE II-continued

Processes for industrial sugar separations described in the literature.
(Note: Glucose/fructose separation, practiced on a large scale in the
corn sweetener industry, is excluded as it is not considered pertinent to
the separation of biomass-based sugar liquors.)

| Sugar Pair | System | Reference |
|---|---|---|
| Mannose/Fructose | zeolites | Eur. Pat. Appl. 302,970, 1987 |
| | cation/Ca++ | U.S. Pat. No. 5,466,795 |

Non-Patent References cited in Table II

H. Caruel et al., "Carbohydrate separation by ligand-exchange liquid chromatography: correlation between the formation of sugar-cation complexes and the elution order." J. Chromatogr. 1991, 558(1), 89–104.

Caruel, H., "Procede de Separation Continu d'Hydrates de Carbone par Chromatographie Liquide en Simulation de Lit Mobile," Ph.D. Dissertation, National Polytechnic Institute of Toulouse, France, June 1991.

In addition to chromatographic techniques, precipitation of mannose as an insoluble bisulfate complex from softwood liquors was also disclosed in U.S. Pat. No. 3,677,818.

On the analytical scale, with the exception of gas chromatography of volatile sugar derivatives, modern methods rely nearly exclusively on liquid chromatography. Historically, borate buffers and borate forms of anion exchange resins have been used with some success, although their use appears to have been discontinued with the proliferation of high performance HPLC "sugar" columns in the 1980's. See J. Khym et al., "The separation of sugars by ion-exchange," J. Amer. Chem. Soc., 74, 2090–2094, 1952; R. Kesler, "Rapid quantitative anion-exchange chromatography of carbohydrates," Analytical Chemistry, 1967, 39(12), 1416–1422; A. Floridi, "An improved method for the automated analysis of sugars by ion-exchange chromatography," Journal of Chromatography. 59, 61–70, 1971; and J. Kennedy et al., "The fully automatic ion-exchange and gel-permeation chromatography of neutral monosaccharides and oligosaccharides with Jeolco JLC-6AH analyzer," Carbohydr. Res. 54, 13–21, 1977.

The interaction of sugars with the borate anion is strong, and elution times tend to be long. The use of a starch-packed column with an n-butanol:n-propanol:water mobile phase has been described for the separation of xylose, mannose, and other monosaccharides (S. Gardell, "Chromatographic separation and quantitative determination of monosaccharides," Acta Chemica Scandinavica, 1953, 7, 201–206); as have anion exchange resins in the bisulfate form (Y. Takasaki, "On the separation of sugars," Agr. Biol. Chem. 36(13), 2575–2577, 1972) or sulfate form (L. Larsson et al., "An automated procedure for separation of monosaccharides on ion exchange resins," Acta Chemica Scandinavica. 19, 1357–1364, 1965).

Since the 1980's, cation exchange resin-based analytical HPLC columns for sugar separation have been available from a number of suppliers. Depending on the composition and complexity of the sample matrix, K+, Ca++ or Pb++ columns may be chosen for separations. Pb++ columns have usually provided the highest selectivity for complex sugar mixtures. See Table II.

Commercially available anion exchange resins are typically sold in chloride form. A chloride-form anion exchange resin does not separate different sugars from one another.

A chloride-form anion exchange resin may readily be converted to a hydroxyl-form resin by passing a hydroxyl-containing solution (typically 1 M NaOH) over the resin. However, sugars then bind to the resin too tightly for the process to be commercially useful.

"Pellicular" HPLC columns (CarboPac™ PA1, Dionex Corporation, Sunnyvale, Calif.) have been used for analytical-scale separations of carbohydrates, including mono- and disaccharides, with a packing of 3–7 micron beads of inert latex, coated with 0.1 micron microparticles of a strong base anion exchanger (a quarternary ammonium anion exchanger). This process uses NaOH as an eluent to separate carbohydrates. An increase in the concentration of hydroxyl ions in the mobile phase is used to accelerate elution from the column. The minute size and high cost of the microbeads preclude the use of this apparatus in industrial-scale separations. See Dionex Corporation, "Installation Instructions and Troubleshooting Guide for the CarboPac™ PA1," document no. 034441, revision 01 (Oct. 1, 1990). High selectivities have been obtained with anion exchange pellicular HPLC columns with dilute NaOH gradients and electrochemical detection. See Dionex Corporation, "Installation Instructions and Troubleshooting Guide for the CARBOPAC™ PA10 Analytical Column," Document No. 031193, Revision 02, Jul. 12, 1996, page 20. The hydroxyl anion and the sugars will compete for surface binding sites on the particles of the chromatographic column, particularly when the sugars partially dissociate at high pH levels. Thus increasing the eluant strength, i.e. increasing the NaOH concentration, accelerates elution of the sugars and reduces separation efficiencies, while lower OH— concentrations increase the selectivity at the expense of longer analysis times.

H. Caruel et al., "Carbohydrate separation by ligand-exchange liquid chromatography: correlation between the formation of sugar-cation complexes and the elution order." J. Chromatogr. 1991, 558(1), 89–104 discloses the use of various cation exchange resins to separate certain mixtures of carbohydrates.

Caruel, H., "Procede de Separation Continu d'Hydrates de Carbone par Chromatographie Liquide en Simulation de Lit Mobile," Ph.D. Dissertation, National Polytechnic Institute of Toulouse, France, June 1991 discloses the separations of sugars and sugar alcohols on cation resins in various ionic forms.

U.S. Pat. No. 5,482,631 discloses the use of a strong base anion exchange resin conditioned with a low concentration of hydroxyl to separate inositols from sugars and sugar alcohols.

U.S. Pat. No. 4,837,315 discloses the separation of mannose from mixtures with glucose and other saccharides by adsorption of sulfonated polystyrene divinylbenzene crosslinked ion exchange resins in calcium and ammonium form.

U.S. Pat. No. 4,471,114 discloses a process for separating mannose from glucose by adsorption on zeolites.

U.S. Pat. No. 4,075,406 discloses a method for recovering xylose from pentosan-, preferably xylan-containing raw materials by hydrolyzing the raw material, purifying the hydrolysate by ion exclusion and color removal, and subjecting the purified solution to chromatographic fractionation.

L. Zill et al., "Further Studies on the Separation of the Borate Complexes of Sugars and Related Compounds by Ion-Exchange Chromatography," J. Am. Chem. Soc. 1953, 75, 1339–1344 discloses the separation of complex mixtures of sugars by ion-exchange chromatography of their borate complexes on strong base anion exchangers, and the subsequent removal of borate from the complexes to recover the sugars.

A previously unattained objective in the chromatographic separation of sugars or sugar alcohols, particularly from plant extracts, is to identify a suitable combination of sorbent and solvent such that the differential affinity of the sorbent for the components to be separated is sufficient to give separation on a system of reasonable size, on a preparative scale, in an economically efficient manner; so that the sorbent does not bind any of the components so strongly that frequent periodic regeneration is necessary.

None of the prior processes for separating xylose, mannose, galactose, arabinose, glucose, xylitol, arabitol, sorbitol, galactitol, or mannitol from other sugars and sugar alcohols is fully satisfactory, due to limited separation efficiencies (e.g., cation resins in Ca++ form), chemical costs (e.g., bisulfite precipitation of mannose), or toxicity issues (e.g., cation/Pb ++). Separations on anion exchange resins in sulfate form seek to simultaneously de-ash the liquors (i.e., remove sodium sulfate produced by neutralization of the sulfuric acid used in wood hydrolysis); and isolate xylose from other sugars, although only a small selectivity for xylose has apparently been achieved by the prior methods, while their selectivity for other sugars is practically nil. See, e.g., U.S. Pat. No. 5,084,104.

We have discovered that improved separations of xylose, mannose, galactose, arabinose, glucose, xylitol, arabitol, sorbitol, galactitol, and mannitol (and other monosaccharides and sugar alcohols) may be achieved by chromatography over hydroxyl-form anion exchange surfaces prepared from anion exchange resins at relatively low hydroxyl concentrations. When a strong base anion exchange resin, such as a chloride-form strong base anion exchange resin, is conditioned with a low concentration of hydroxyl (for example, an NaOH solution with a concentration between 0.1 and 1000 mM, preferably between 0.1 and 100 mM, most preferably between 1 and 10 mM), the conditioned resin separates a number of sugars and sugar alcohols from one another, while still allowing ready desorption of those carbohydrates from the resin. The novel process is efficient in separating glucose, mannose, xylose, arabinose, and galactose, the principal sugar constituents of biomass. The novel process is also efficient in separating sugar alcohols, such as xylitol, arabitol, sorbitol, galactitol, and mannitol, from one another or from sugars.

The feedstock is first passed over a column containing this conditioned resin, followed by a mobile phase solvent, preferably water. If desired, continued application of the mobile phase to the column may optionally be used for the selective recovery of other organic materials as well. The novel process may economically be performed on industrial-scale separations, particularly when used in a preferred simulated moving bed chromatographic system.

Strong base anion exchange resins, for example in chloride form, may for example be conditioned with dilute solutions of hydroxide, or dilute mixtures of chloride and hydroxide. Increasing concentrations of hydroxide improve separation efficiencies, but increase residence times, while the opposite holds for chloride concentrations. The novel method is suitable for continuous countercurrent separation techniques, such as simulated moving bed chromatography. Separations achieved with the novel system are superior to those obtained with sulfate-form anion exchangers. (Compare, e.g., the results shown in FIG. 2 here with those reported in U.S. Pat. No. 5,084,104.)

Anion exchange resins have usually been used in the past for demineralization of solutions, i.e., for ion exchange, or for decolorization, i.e., for adsorption. By contrast, in the present invention there is little or no net ion exchange or adsorption between the resin and the solution. Although an anion-type ion exchange resin is used, it is used for its properties as a chromatographic substrate, rather than in a column intended primarily for net exchange of ions.

Chromatographic separation differs from other column-based separations (e.g., ion-exchange or adsorption) in that no major component in the feed mixture is retained by the sorbent so strongly as to require that additional reagents be routinely used between cycles to regenerate the column by removing strongly retained components before the next separation cycle. (Of course, even chromatographic columns require some degree of periodic cleansing or regeneration, but in general a chromatographic column may be re-used for multiple cycles before regeneration.) Put differently, the function of an ion-exchange or adsorption column is to bind components tightly, necessarily requiring frequent regeneration for the resin to be reused. By contrast, the function of a chromatographic column is to provide differential mobility for components moving through the column to effect a separation, but not to bind too tightly to the principal components. Regeneration of a chromatographic column may be needed from time to time due to incidental binding of minor components or impurities to the resin.

The minimal quantity of reagents needed for resin regeneration is a major advantage of chromatographic separations over ion-exchange separations. The operational cost of chromatographic separations is due primarily to the energy needed to evaporate water (or other solvent) from dilute products, and to a lesser extent to the infrequent replacement or regeneration of resin.

A preferred method for large-scale chromatographic separations is the simulated moving bed method ("SMB"). The SMB method reduces the consumption of water or other solvent, and hence evaporation costs, as compared with batch methods. The principles of the simulated moving bed method have been generally described, for example, in U.S. Pat. Nos. 5,198,120; 2,985,589; 4,404,037; 4,412,866; 5,482,631; and European Patent EP 0 345 511 A2. Briefly, the SMB method uses a number of columns (e.g., 8 to 12 in number) packed with a suitable sorbent and connected in series. There are inlet ports for feed and solvent (which may include recycled solvent), and outlet ports for two or more products (or other separated fractions). The positions of the ports relative to the columns are periodically switched along the direction of the liquid flow, thereby simulating continuous motion of the sorbent relative to the ports and to the liquid. The advantages of the SMB method are those generally associated with counter-current-type operations, namely lower solvent (e.g., water) and sorbent requirements. The water input to the SMB system preferably comprises a mixture of fresh water and water recycled within the system.

The SMB process may readily be optimized by adjusting the flow rates (of feed, fresh water, recycled water, and products), and by adjusting the switch time (the time period between moving the ports one column downstream).

Without wishing to be bound by this theory, it is believed that a likely explanation for the success of the present invention is that at low concentrations, NaOH is excluded from the interior of the strong base anion exchange particles by electrostatic repulsion. The hydroxyl ions then affect only the external surface of the resin particles, resulting in a strong base anion exchange resin having a chloride-form (or other anion) core and a hydroxyl-form surface, producing a resin with separation properties substantially different from those of either pure chloride-form or pure hydroxyl-form resins.

The eluant preferably has traces of a base present (e.g., 1 to 10 mM NaOH), such as to just offset the loss of hydroxyl groups on the surface of the resin that will slowly occur as a result of other anions present in the water (e.g., carbonate, bicarbonate, or chloride), or in the feed to be separated (e.g., chloride or sulphate). But the concentration of base should not be high enough to convert the core of the resin to hydroxyl form.

EXAMPLES

Mannose and xylose were chosen as the critical pair for proof of concept and for optimizing the separation, due both to the historical difficulty in efficiently separating these sugars from one another, and the potential interest in fractionating these sugars from softwood hydrolysate liquors. The separation of other sugars was also monitored.

Materials and Methods

Separation tests were performed with 1×100 cm Omnifit (Supelco, Bellefonte, Pa.) jacketed glass columns (resin volume about 75 ml), packed with the anion exchange resin, and held at a constant temperature with an external water bath. Prior to each test, the column was fully converted to the Cl— form with 400 ml of 0.2 N NaCl at a 2.5 ml/min flow rate, followed by a thorough rinse with 2000 ml of deionized water. The resin was then conditioned with 500 ml of dilute solution of NaOH, or a mixture of NaOH and NaCl, again at 2.5 ml/min. The resin was then completely rinsed with deionized water again, after which it was ready for sugar separation tests.

A 1 ml volume of each sample—either a synthetic solution of two or more sugars or a purified biomass hydrolysate—was injected at the top of the column with a rotary valve injector (Rheodyne, Inc., Cotati, Calif.). The sample was then eluted with deionized water at a predetermined flow rate with a Waters™ (Milford, Mass.) 610 Fluid Unit pump and a Waters™ 600 Controller. A preparative Waters™ R-400 differential refractometer was used to monitor the separation on-line, and was connected to a chart recorder. 10 ml fractions were collected from the exit of the column, and their sugar profiles were determined off-line with a Dionex (Sunnyvale, Calif.) DX 500 chromatography system, equipped with a Dionex CarboPac™ PA10 4×250 mm column.

Results

Figure 1:
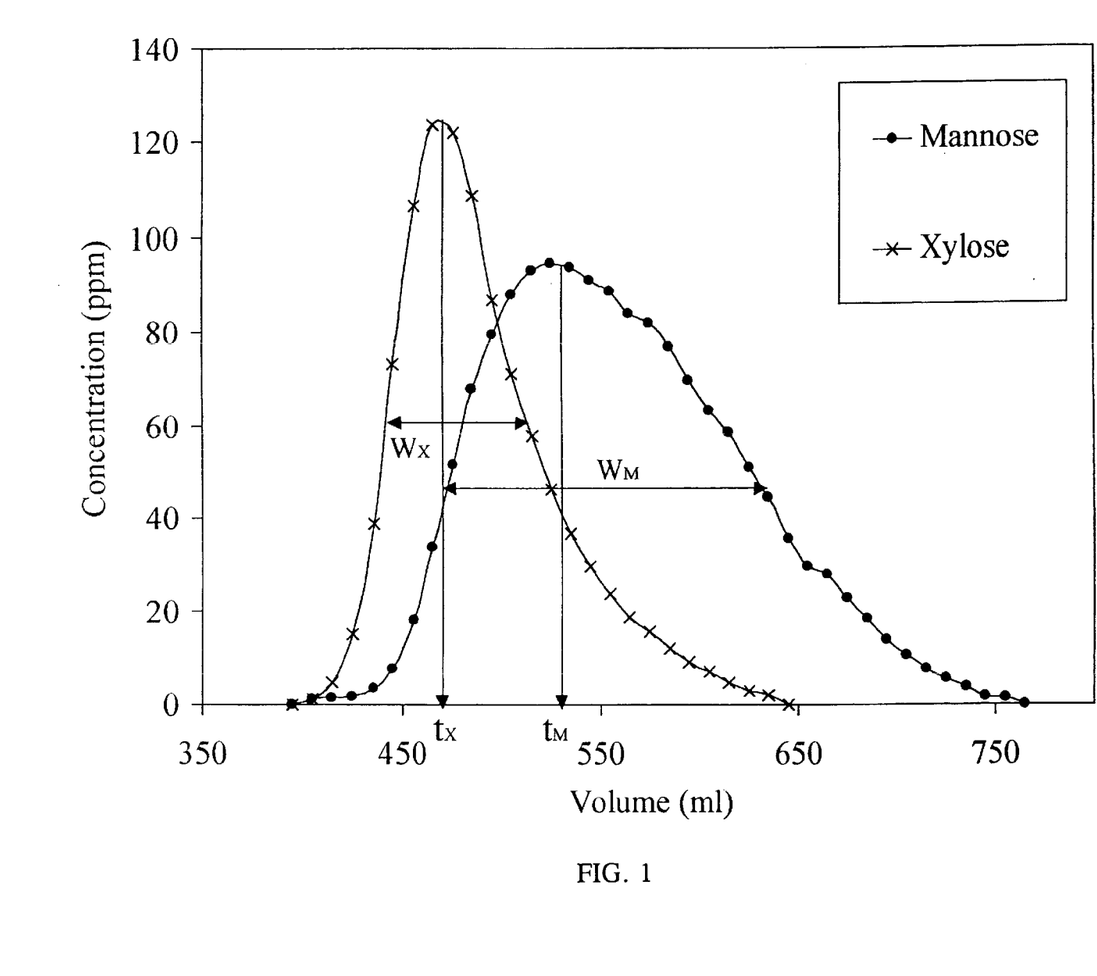
FIG. 1 illustrates a xylose/mannose separation achieved with an embodiment of the present invention.

FIG. 1 illustrates a xylose/mannose separation achieved with an embodiment of the present invention. The column was a 1×100 cm, Bio-Rad AG MP-1 (150–300 μm). The eluent was deionized water at 2.5 ml/min. The resin was conditioned with an aqueous solution having $C_{NaOH}$=25 mM, $C_{NaCl}$=5 mM. The resolution obtained was $R_s$=0.30.

The degree of separation shown in FIG. 1 was quantified by measuring the retention volume of a peak t in ml (elution time at peak maximum multiplied by the flow rate), peak width W (ml) at half height (peak width at half height in units of time multiplied by the flow rate). The resolution factor $R_s$ was calculated as $$R_s = \beta(t_{2-t1})/[\tfrac{1}{2}(W_2+W_1)]$$

and the selectivity S, as $$S = (t_2-t_0)/(t_1-t_0)$$

where the coefficient β, the ratio of half-height to base peak width, was taken as 0.43, and $t_0$, the total void volume of the column, was measured by injecting a dilute NaCl solution.

Results for the mannose/xylose separations are given in Tables III, IV, and V.

TABLE III

Effect of resin conditioning with dilute solutions of NaOH and NaCl on the separation of xylose and mannose (10 g/L each). 1 × 100 cm column, Bio-Rad AG MP-1 (150–300 μm particle size) anion exchange resin. Flow rate: 2.5 ml/min.

| $C_{NaOH}$ mN | $C_{NaCl}$ mN | $t_X$ ml | $t_M$ ml | $W_X$ ml | $W_M$ ml | $R_s$ | S |
|---|---|---|---|---|---|---|---|
| 0 | 0 | 65 | 65 | 18 | 20 | 0.000 | 1.00 |
| 5 | 0 | 165 | 185 | 54 | 104 | 0.148 | 1.16 |
| 5 | 5 | 130 | 140 | 44 | 76 | 0.098 | 1.11 |
| 5 | 10 | 130 | 140 | 34 | 54 | 0.132 | 1.11 |
| 10 | 0 | 250 | 290 | 72 | 120 | 0.245 | 1.19 |
| 10 | 5 | 230 | 260 | 56 | 99 | 0.228 | 1.16 |
| 10 | 10 | 185 | 205 | 38 | 78 | 0.201 | 1.14 |
| 25 | 0 | 510 | 570 | 113 | 182 | 0.238 | 1.13 |
| 25 | 5 | 465 | 525 | 70 | 160 | 0.307 | 1.14 |
| 25 | 10 | 350 | 400 | 57 | 132 | 0.310 | 1.16 |
| 25 | 20 | 155 | 175 | 39 | 76 | 0.204 | 1.17 |

TABLE IV

Effect of sugar concentration on the chromatographic separation of xylose and mannose. 1 × 100 cm column, Bio-Rad AG MP-1 (150–300 μm particle size) anion exchange resin, flow rate 2.5 ml/min. $C_{NaCl}$ = 0.

| Sugars Conc. g/L | $C_{NaOH}$ mN | $t_X$ ml | $t_M$ ml | $W_X$ ml | $W_M$ ml | $R_s$ | S |
|---|---|---|---|---|---|---|---|
| 20 | 5 | 165 | 185 | 54 | 104 | 0.148 | 1.16 |
| 50 | 5 | 110 | 120 | 47 | 74 | 0.098 | 1.14 |
| 20 | 10 | 250 | 290 | 72 | 120 | 0.245 | 1.19 |
| 50 | 10 | 195 | 225 | 55 | 127 | 0.193 | 1.19 |
| 100 | 10 | 145 | 165 | 50 | 111 | 0.146 | 1.19 |

TABLE V

Effect of flow rate on the chromatographic separation of xylose and mannose. 1 × 100 cm column, Bio-Rad AG MP-1 (150–300 μm particle size) anion exchange resin. Sugar concentration, 20 g/L each. $C_{NaOH}$ = 10 mM, $C_{NaCl}$ = 0.

| Flow rate ml/min | $t_X$ ml | $t_M$ ml | $W_X$ ml | $W_M$ ml | $R_s$ | S |
|---|---|---|---|---|---|---|
| 1.25 | 205 | 220 | 24 | 48 | 0.247 | 1.09 |
| 2.5 | 250 | 290 | 72 | 120 | 0.245 | 1.19 |
| 5.0 | 290 | 350 | 139 | 226 | 0.193 | 1.24 |

The ratio of OH— and Cl— ions in the conditioning solution affected the extent to which the resin was converted from Cl— to OH— form. Because the NaOH solutions used were very dilute, the degree of conversion was only marginal. It is believed, without wishing to be bound by this theory, that the conversion occurred primarily on the surface of the resin particles. On a pure Cl— form resin ($C_{NaOH}$=0), no separation occurred, while on a resin fully converted to OH— form, adsorption of sugars was effectively irreversible (data not shown). Increasing the NaOH concentration increased the retention time, t, and the peak width, W, while the opposite was true for increasing concentrations of NaCl. Resolution for separation of the mannose/xylose pair generally increased with increasing $C_{NaOH}$, at the expense of longer elution times. The separation suffered as feed sugar concentration and flow rate increased (Tables IV and V).

Figure 2:
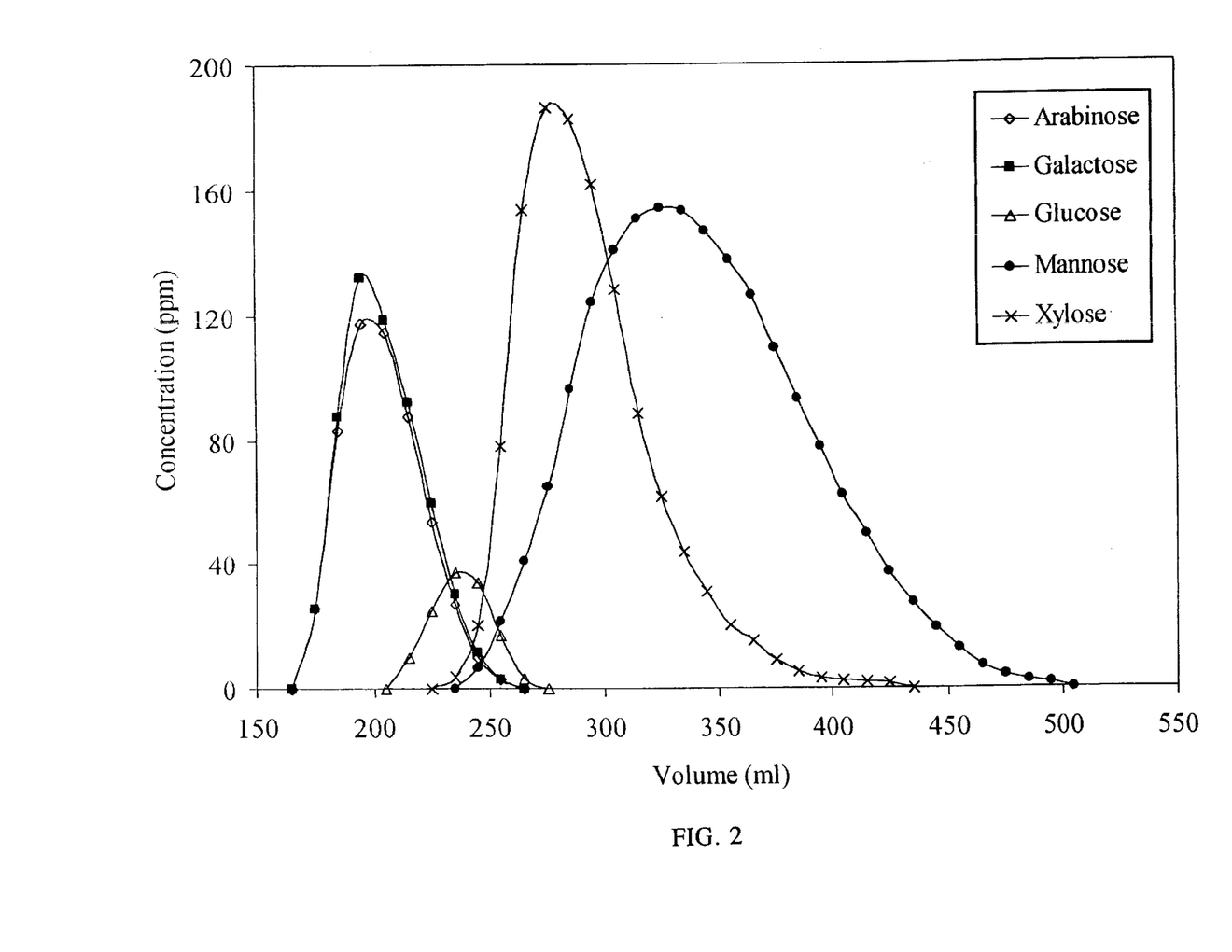
FIG. 2 illustrates a separation of a purified softwood hydrolysate liquor achieved with an embodiment of the present invention.

A separation of a purified softwood hydrolysate liquor is illustrated in FIG. 2. The column was a 1×100 cm, Bio-Rad AG MP-1 (150–300 μm). The eluent was deionized water at 2.5 ml/min. The solution used to condition the resin was an aqueous solution having $C_{NaOH}$=10 mM, $C_{NaCl}$=0. The resolution obtained was $R_s$=0.35.

With the exception of the galactose/arabinose pair, as shown in FIG. 2 the sugars were separated from one another reasonably well, with mannose (the major component) eluting last, preceded by xylose and glucose. The xylose/mannose resolution $R_s$ was 0.35, somewhat higher than was seen for a synthetic 1:1 solution at the same experimental conditions, presumably because of the lower relative xylose concentration in the softwood hydrolysate sample.

All results shown in Tables III–V and FIGS. 1 and 2 were obtained at ambient temperature. At temperatures of 45° C. and higher (data not shown) the monosaccharides can degrade in contact with the OH— surface, and their recoveries are correspondingly low. The ionic content of the feed solution may affect both optimum $C_{NaOH}$ levels and the required frequency of re-conditioning of the columns. It is preferred that the feed solutions be demineralized before chromatography to prevent rapid deactivation of the anion exchanger.

As illustrated in FIG. 2, softwood sugars may, for example, be separated into three fractions: Fraction 1 (arabinose, galactose, glucose); Fraction 2 (xylose); and Fraction 3 (mannose).

Further Examples

The novel technique can be used not only to separate sugars from other sugars, but also sugars from sugar alcohols, and different sugar alcohols from one another. Tables VI, VII, and VIII give examples of such separations.

TABLE VI

Effect of NaOH concentration on retention time of sugar alcohols. 1 × 100 cm column, Bio-Rad AG MP-1 (150–300 μm particle size). The injected sample was the supernatant following a partial crystallization of a demineralized, hydrogenated softwood liquor. Total sample concentration (weight percentage of total solids) was 5%. Retention times shown are in mL of eluted solution. Flow Rate, 2.5 ml/min. $C_{NaCl}$ = 0.

| $C_{NaOH}$ (mM) | Xylitol | Arabitol | Sorbitol/ Galactitol | Mannitol |
| --- | --- | --- | --- | --- |
| 10 | 55 | 55 | 55 | 60 |
| 50 | 105 | 115 | 125 | 145 |
| 100 | 95 | 110 | 130 | 165 |
| 250 | 116 | 136 | 176 | 216 |

TABLE VII

Effect of total sample concentration on retention time of sugar alcohols. 1 × 100 cm column, Bio-Rad AG MP-1 (150–300 μm particle size). The injected sample was as in Table VI. The resin was modified with a 100 mM NaOH solution. Retention times shown are in mL of eluted solution. Flow Rate, 2.5 ml/min. $C_{NaCl}$ = 0.

| Sample concentration (%) | Xylitol | Arabitol | Sorbitol/ Galactitol | Mannitol |
| --- | --- | --- | --- | --- |
| 5 | 95 | 110 | 130 | 165 |
| 10 | 90 | 105 | 125 | 155 |
| 20 | 82.5 | 92.5 | 112.5 | 135 |

TABLE VIII

Separations of mixtures of sugars and sugar alcohols at total sample concentrations of 4–5%. 1 × 100 cm column, Bio-Rad AG MP-1 (150–300 μm particle size). This Table combines results obtained in separate separations of sugars and of sugar alcohols. The injected sample for the sugars was as in FIG. 2. The injected sample for the sugar alcohols was as in Table VI. The resin was modified with a 10 mM NaOH solution. Retention times shown are in mL of eluted solution. Flow Rate, 2.5 ml/min. $C_{NaCl}$ = 0.

| Xylitol | Sorbitol/ Galactitol | Arabitol | Mannitol | Arabinose | Galactose | Glucose | Xylose | Mannose |
| --- | --- | --- | --- | --- | --- | --- | --- | --- |
| 55 | 55 | 55 | 65 | 200 | 200 | 230 | 270 | 310 |

Figure 3:
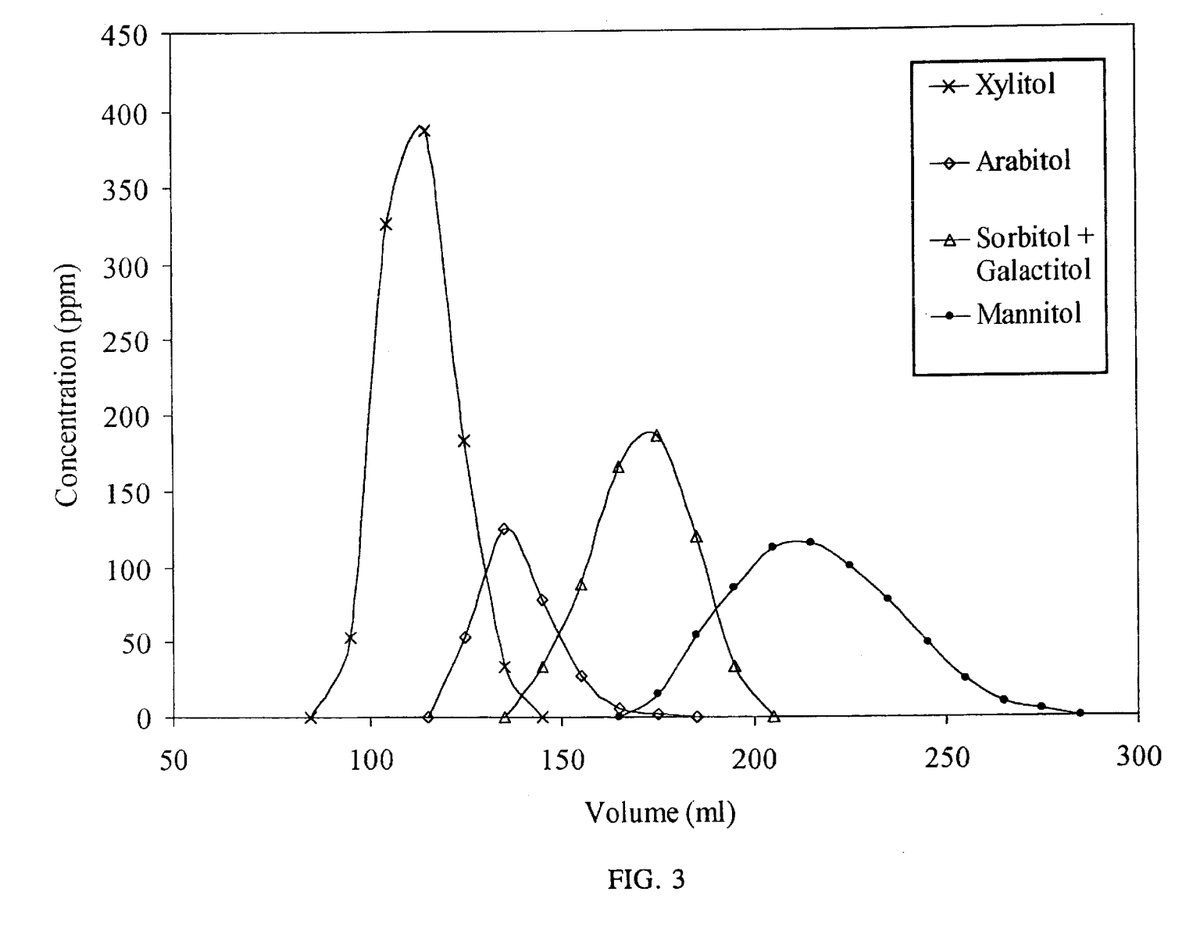
FIG. 3 illustrates the results of a separation of sugar alcohols achieved with an embodiment of the present invention.

FIG. 3 depicts the separation of Table VI, bottom row.

It is preferred that the separations be performed with one of the variants known in the art for a counter-current, simulated moving bed, chromatographic system capable of three-fraction separations.

With less pure feeds, such as natural extracts containing other anions (e.g., chloride or sulphate), the strength of the base in the mobile phase may have to be adjusted. The extracts or liquors are preferably first demineralized in a conventional manner, e.g., by passing through a column packed with a strong acid cation exchange resin followed by a column packed with a strong base anion exchange resin, or a single column with a mixed bed of cation and anion exchange resins. As in other forms of chromatographic separations, to protect the chromatography column resin from premature fouling, it is preferred to use feeds that are optically clear, with a concentration of suspended solids less than about 100 mg/l. Standard processes for clarification may be used, including centrifugation, filtration, settling, flocculation, or a combination of these techniques. The clarification is preferably performed prior to demineralization, to protect the demineralization resins from fouling as well.

Although chloride-form resins are preferred, anion exchange resins other than in chloride form (before conditioning with base) will also work in practicing the present invention. The anion should not be strongly basic, or as is the case when a hydroxide-form resin is used, the sugars will bind the resin too tightly. Additionally, the physical size of the anion should not be so large (e.g., some polymeric anions) as to block access to the resin. Otherwise, most common anions will work in the present invention. Illustrative of anions that may be substituted for chloride in practicing the present invention are fluoride, bromide, iodide, nitrite, nitrate, sulphate, bisulphate, monobasic or dibasic phosphate, chlorate, citrate, chlorate, cyanide, sulphite, bisulphite, bromate, carbonate, bicarbonate, iodate, formate, propionate, and acetate.

Although the conditioning of the bed is preferably performed with one to ten bed volumes of hydroxyl ion at a concentration between 1 and 10 mM, it will also be possible to practice the present invention by conditioning the bed with at least one-tenth bed volume of hydroxyl ion in a concentration between 0.1 mM and 1000 mM.

Illustrative of the types of feeds that may be used in the present invention are hardwood or softwood liquor hydrolysates, bagasse liquor hydrolysate, oat hull liquor hydrolysate, corn cob liquor hydrolysate, rice straw liquor hydrolysate, and other biomass liquor hydrolysates. Sugar alcohol feeds may, for example, be prepared by hydrogenating such feeds by reaction of sugars in such raw feeds with hydrogen gas—feeds for separating sugar alcohols may thus include, for example, hydrogenated hardwood or softwood liquor hydrolysates, hydrogenated bagasse liquor hydrolysate, hydrogenated oat hull liquor hydrolysate, and other hydrogenated biomass liquor hydrolysates.

The complete disclosures of all references cited in this specification are hereby incorporated by reference. In the event of an otherwise irreconcilable conflict, however, the present specification shall control.

We claim:

1. A method for separating a carbohydrate selected from the group consisting of xylose, mannose, galactose, arabinose, glucose, xylitol, arabitol, sorbitol, galactitol, and mannitol; from an aqueous phase comprising the carbohydrate and at least one other, nonidentical component, wherein the nonidentical component is a sugar if the carbohydrate is a sugar, and wherein the nonidentical component is a sugar alcohol if the carbohydrate is a sugar alcohol; wherein the aqueous phase is selected from the group consisting of a softwood liquor, a hardwood liquor, a softwood liquor hydrolysate, a hardwood liquor hydrolysate, a bagasse liquor hydrolysate, an oat hull liquor hydrolysate, a corn cob liquor hydrolysate, a rice straw liquor hydrolysate, a hydrogenated softwood liquor, a hydrogenated hardwood liquor, a hydrogenated softwood liquor hydrolysate, a hydrogenated hardwood liquor hydrolysate, a hydrogenated bagasse liquor hydrolysate, a hydrogenated oat hull liquor hydrolysate, a hydrogenated corn cob liquor hydrolysate, or a hydrogenated rice straw liquor hydrolysate; said method comprising the steps of passing the aqueous phase over a resin, and collecting that portion of the aqueous phase exiting the resin that contains the carbohydrate; wherein the resin comprises a strong base anion exchange resin in chloride form that has been conditioned with a sufficient concentration of hydroxyl ion that hydroxyl ion resides on the surface of the resin, but such that the hydroxyl ion does not penetrate the interior of the resin.

2. A method as recited in claim 1, wherein the carbohydrate is xylose.

3. A method as recited in claim 1, wherein the carbohydrate is mannose.

4. A method as recited in claim 1, wherein the carbohydrate is galactose.

5. A method as recited in claim 1, wherein the carbohydrate is arabinose.

6. A method as recited in claim 1, wherein the carbohydrate is glucose.

7. A method as recited in claim 1, wherein the carbohydrate is xylitol.

8. A method as recited in claim 1, wherein the carbohydrate is arabitol.

9. A method as recited in claim 1, wherein the carbohydrate is sorbitol.

10. A method as recited in claim 1, wherein the carbohydrate is galactitol.

11. A method as recited in claim 1, wherein the carbohydrate is mannitol.

12. A method for separating a carbohydrate selected from the group consisting of xylose, mannose, galactose, arabinose, glucose, xylitol, arabitol, sorbitol, galactitol, and mannitol; from an aqueous phase comprising the carbohydrate and at least one other, nonidentical component, wherein the nonidentical component is a sugar if the carbohydrate is a sugar, and wherein the nonidentical component is a sugar alcohol if the carbohydrate is a sugar alcohol; wherein the aqueous phase is selected from the group consisting of a softwood liquor, a hardwood liquor, a softwood liquor hydrolysate, a hardwood liquor hydrolysate, a bagasse liquor hydrolysate, an oat hull liquor hydrolysate, a corn cob liquor hydrolysate, a rice straw liquor hydrolysate, a hydrogenated softwood liquor, a hydrogenated hardwood liquor, a hydrogenated softwood liquor hydrolysate, a hydrogenated hardwood liquor hydrolysate, a hydrogenated bagasse liquor hydrolysate, a hydrogenated oat hull liquor hydrolysate, a hydrogenated corn cob liquor hydrolysate, or a hydrogenated rice straw liquor hydrolysate; said method comprising the steps of passing the aqueous phase over a resin, and collecting that portion of the aqueous phase exiting the resin that contains the carbohydrate; wherein the resin comprises a strong base anion exchange resin in chloride form that has been conditioned with at least about one-tenth bed volume of an aqueous solution of hydroxyl ion in a concentration between about 0.1 millimolar and about 1000.0 millimolar.

13. A method as recited in claim 12, wherein the carbohydrate is xylose.

14. A method as recited in claim 12, wherein the carbohydrate is mannose.

15. A method as recited in claim 12, wherein the carbohydrate is galactose.

16. A method as recited in claim 12, wherein the carbohydrate is arabinose.

17. A method as recited in claim 12, wherein the carbohydrate is glucose.

18. A method as recited in claim 12, wherein the carbohydrate is xylitol.

19. A method as recited in claim 12, wherein the carbohydrate is arabitol.

20. A method as recited in claim 12, wherein the carbohydrate is sorbitol.

21. A method as recited in claim 12, wherein the carbohydrate is galactitol.

22. A method as recited in claim 12, wherein the carbohydrate is mannitol.

23. A method as recited in claim 12, additionally comprising the step of demineralizing the aqueous phase, before conducting said step of passing the aqueous phase over the resin.

24. A method as recited in claim 12, additionally comprising the step of clarifying the aqueous phase to have a suspended solids concentration less than about 100 mg per liter, before conducting said step of passing the aqueous phase over the resin.

25. A method as recited in claim 12, additionally comprising the steps of demineralizing the aqueous phase, and clarifying the aqueous phase to have a suspended solids concentration less than about 100 mg per liter, wherein both said demineralizing step and said clarifying step are conducted before conducting said step of passing the aqueous phase over the resin.

26. A method as recited in claim 12, wherein said method is performed in a simulated moving bed chromatographic system.

27. A method as recited in claim 12, wherein the resin comprises a strong base anion exchange resin in chloride form that has been conditioned with between about one and about ten bed volumes of an aqueous solution of hydroxyl ion in a concentration between about 1.0 millimolar and about 10.0 millimolar.

28. A method for separating a carbohydrate selected from the group consisting of xylose, mannose, galactose, arabinose, glucose, xylitol, arabitol, sorbitol, galactitol, and mannitol; from an aqueous phase comprising the carbohydrate and at least one other, nonidentical component, wherein the nonidentical component is a sugar if the carbohydrate is a sugar, and wherein the nonidentical component is a sugar alcohol if the carbohydrate is a sugar alcohol; wherein the aqueous phase is selected from the group consisting of a softwood liquor, a hardwood liquor, a softwood liquor hydrolysate, a hardwood liquor hydrolysate, a bagasse liquor hydrolysate, an oat hull liquor hydrolysate, a corn cob liquor hydrolysate, a rice straw liquor hydrolysate, a hydrogenated softwood liquor, a hydrogenated hardwood liquor, a hydrogenated softwood liquor hydrolysate, a hydrogenated hardwood liquor hydrolysate, a hydrogenated bagasse liquor hydrolysate, a hydrogenated oat hull liquor hydrolysate, a hydrogenated corn cob liquor hydrolysate, or a hydrogenated rice straw liquor hydrolysate; said method comprising the steps of passing the aqueous phase over a resin, and collecting that portion of the aqueous phase exiting the resin that contains the carbohydrate; wherein the resin comprises a strong base anion exchange resin in an anion form, other than hydroxyl form, that has been conditioned with a sufficient concentration of hydroxyl ion that hydroxyl ion resides on the surface of the resin, but such that the hydroxyl ion does not penetrate the interior of the resin.

29. A method as recited in claim 28, wherein said method is performed in a simulated moving bed chromatographic system.

30. A method for separating a carbohydrate selected from the group consisting of xylose, mannose, galactose, arabinose, glucose, xylitol, arabitol, sorbitol, galactitol, and mannitol; from an aqueous phase comprising the carbohydrate and at least one other, nonidentical component, wherein the nonidentical component is a sugar if the carbohydrate is a sugar, and wherein the nonidentical component is a sugar alcohol if the carbohydrate is a sugar alcohol; wherein the aqueous phase is selected from the group consisting of a softwood liquor, a hardwood liquor, a softwood liquor hydrolysate, a hardwood liquor hydrolysate, a bagasse liquor hydrolysate, an oat hull liquor hydrolysate, a corn cob liquor hydrolysate, a rice straw liquor hydrolysate, a hydrogenated softwood liquor, a hydrogenated hardwood liquor, a hydrogenated softwood liquor hydrolysate, a hydrogenated hardwood liquor hydrolysate, a hydrogenated bagasse liquor hydrolysate, a hydrogenated oat hull liquor hydrolysate, a hydrogenated corn cob liquor hydrolysate, or a hydrogenated rice straw liquor hydrolysate; said method comprising the steps of passing the aqueous phase over a resin, and collecting that portion of the aqueous phase exiting the resin that contains the carbohydrate; wherein the resin comprises a strong base anion exchange resin in an anion form, other than hydroxyl form, that has been conditioned with at least about one-tenth bed volume of an aqueous solution of hydroxyl ion in a concentration between about 0.1 millimolar and about 1000.0 millimolar.

31. A method as recited in claim 30, wherein the resin comprises a strong base anion exchange resin in chloride form that has been conditioned with between about one and about ten bed volumes of an aqueous solution of hydroxyl ion in a concentration between about 1.0 millimolar and about 10.0 millimolar.

* * * * *